United States Patent
Chen et al.

(10) Patent No.: US 11,153,672 B2
(45) Date of Patent: Oct. 19, 2021

(54) METHOD FOR TRANSMITTING INFORMATION, COMMUNICATION DEVICE, PORTABLE DEVICE AND COMMUNICATION SYSTEM

(71) Applicant: SHENZHEN GOODIX TECHNOLOGY CO., LTD., Shenzhen (CN)

(72) Inventors: Gaobo Chen, Shenzhen (CN); Shuqing Cheng, Shenzhen (CN); Dansheng Chen, Shenzhen (CN); Ming Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/887,085

(22) Filed: May 29, 2020

(65) Prior Publication Data
US 2020/0296499 A1 Sep. 17, 2020

Related U.S. Application Data

(63) Continuation of application No. PCT/CN2019/074289, filed on Jan. 31, 2019.

(51) Int. Cl.
*H04R 1/10* (2006.01)
*H02J 7/00* (2006.01)

(52) U.S. Cl.
CPC .......... *H04R 1/1016* (2013.01); *H02J 7/0042* (2013.01); *H04R 1/1025* (2013.01); *H04R 2420/07* (2013.01)

(58) Field of Classification Search
CPC ............... H04R 1/1016; H04R 1/1025; H04R 2420/07; H02J 7/0042
USPC ............................................ 381/74, 309, 311
See application file for complete search history.

(56) References Cited

U.S. PATENT DOCUMENTS

| | | | |
|---|---|---|---|
| 7,577,459 B2 | 8/2009 | Tuomela et al. | |
| 9,479,857 B2 | 10/2016 | Rosener et al. | |
| 9,831,710 B2 | 11/2017 | Goma et al. | |
| 2004/0138723 A1* | 7/2004 | Malick | H04R 25/552 |
| | | | 607/57 |

(Continued)

FOREIGN PATENT DOCUMENTS

| | | |
|---|---|---|
| CN | 103209234 A | 7/2013 |
| CN | 104137386 A | 11/2014 |

(Continued)

*Primary Examiner* — William A Jerez Lora (57) ABSTRACT

A method for transmitting information, a communication device, a portable device and a communication system are provided. The method is applied to a portable device; and the method includes: receiving and/or transmitting information in an electric field coupling manner through a first coupling electrode disposed at the portable device and a second coupling electrode at an opposite end. In an embodiment of the present application, the information is received and/or transmitted through an electric field coupling manner, which could not only improve communication quality and connection reliability on the basis of reducing communication power consumption of a portable device (such as an earphone or a charging case), but also reduce a volume of the portable device, simplify a structure and further improve user experience.

18 Claims, 8 Drawing Sheets

(56) References Cited

U.S. PATENT DOCUMENTS

| | | |
|---|---|---|
| 2006/0258408 A1 | 11/2006 | Tuomela et al. |
| 2008/0212971 A1* | 9/2008 | Shaanan ............ H04B 10/1141 |
| | | 398/130 |
| 2009/0041290 A1* | 2/2009 | Yang ........................ H04R 9/06 |
| | | 381/396 |
| 2011/0182458 A1 | 7/2011 | Rosener et al. |
| 2014/0077613 A1 | 3/2014 | Song et al. |
| 2014/0339903 A1 | 11/2014 | Goma et al. |
| 2015/0318896 A1 | 11/2015 | Kerselaers et al. |
| 2020/0068285 A1* | 2/2020 | Dang ................... H04R 1/1016 |
| 2020/0107126 A1 | 4/2020 | Zheng et al. |

FOREIGN PATENT DOCUMENTS

| | | |
|---|---|---|
| CN | 109257111 A | 1/2019 |
| EP | 2942876 A1 | 11/2015 |

* cited by examiner

100

| Receiving and/or transmitting information in an electric field coupling manner through a first coupling electrode disposed at a portable device and a second coupling electrode at an opposite end | —S110 |

METHOD FOR TRANSMITTING INFORMATION, COMMUNICATION DEVICE, PORTABLE DEVICE AND COMMUNICATION SYSTEM

CROSS-REFERENCE TO RELATED APPLICATIONS

This application is a continuation of International Application No. PCT/CN2019/074289, filed on Jan. 31, 2019, the disclosure of which is hereby incorporated by reference in its entirety.

TECHNICAL FIELD

Embodiments of the present application relate to the field of communications, and in particular, to a method for transmitting information, a communication device, a portable device, and a communication system.

BACKGROUND

At present, information synchronization technology between two earphones in a pair of Bluetooth headsets mainly includes Bluetooth technology and magnetic field coupling technology. However, a frequency used by the Bluetooth technology is too high, a human body attenuates a high frequency signal greatly, and therefore, when the Bluetooth technology is used, larger transmission power is required to be used, so that the signal is transmitted "around" a human brain, and its communication power consumption is too large. The magnetic field coupling technology requires a magnetic core with good directivity, and generally a volume of this magnetic core is relatively large, which is in conflict with a design requirement for miniaturizing a wireless earphone.

Information synchronization technology between an earphone and a charging case mainly includes power line carrier communication technology and serial communication technology. Similarly, a design for circuits of the power line carrier communication technology is too complicated, which requires an additional circuit chip. The serial communication technology reduces reliability of a circuit connection, thereby reducing communication quality. In addition, both the power line carrier communication technology and the serial communication technology require a physical contact point, which reduces reliability of a connection between the earphone and the charging case.

Therefore, there is an urgent need in the field for an earphone or a charging case with small volume, low communication power consumption, simple structure, and high communication quality and connection reliability.

SUMMARY

Provided are a method for transmitting information, a communication device, a portable device and a communication system, which could not only improve communication quality and connection reliability on the basis of reducing communication power consumption of a portable device (such as an earphone or a charging case), but also reduce a volume of the portable device, simplify a structure and further improve user experience.

According to a first aspect, provided is a method for transmitting information, where the method is applied to a portable device; the method includes: receiving and/or transmitting information in an electric field coupling manner through a first coupling electrode disposed at the portable device and a second coupling electrode at an opposite end; wherein the method is applied to a first earphone in a pair of wireless earphones, the first coupling electrode is disposed at a rod part of the first earphone, or the first coupling electrode is a conductive component of the first earphone; or the method is applied to a charging case with a slot or hole for accommodating the opposite end, and the first coupling electrode is disposed at a side wall of the slot or hole, or the first coupling electrode is a conductive part of the side wall of the slot or hole.

In an embodiment of the present application, for a communication manner of a portable device (such as an earphone or a charging case), a first coupling electrode is built-in the portable device, such that the portable device may perform communication in an electric field coupling manner through a first coupling electrode and a second coupling electrode at an opposite end.

As a human body attenuates an electric field slightly and communication employing an electric field coupling manner may be implemented through two coupling electrodes, this communication manner could not only improve communication quality on the basis of reducing communication power consumption of a portable device, but also reduce a volume of the portable device, simplify a structure, and further improve user experience.

In addition, as a main constituent of a human body is water, which is a medium with a high dielectric constant, when the first coupling electrode and the second coupling electrode are both attached to skin of the human body, it is equivalent to that a medium with a very large dielectric constant is inserted between a coupling capacitor formed by the first coupling electrode and the second coupling electrode, which could further improve the communication quality of the portable device.

Furthermore, performing the communication through the electric field coupling manner could avoid setting a physical contact point for the portable device and could increase connection reliability of the portable device such as connection reliability between earphones or an earphone and a charging case.

According to a second aspect, provided is a communication device, where the communication device is applied to a portable device, the communication device includes: a first coupling electrode; a first transmitting circuit and a first receiving circuit, which are connected to the first coupling electrode, respectively; where the first transmitting circuit is configured to transmit information to an opposite end in an electric field coupling manner through the first coupling electrode and a second coupling electrode at the opposite end, and the first receiving circuit is configured to receive information transmitted by the opposite end in an electric field coupling manner through the first coupling electrode and the second coupling electrode; wherein the portable device is a first earphone in a pair of wireless earphones, the first coupling electrode is disposed at a rod part of the first earphone, or the first coupling electrode is a conductive component of the first earphone; or the portable device is a charging case with a slot or hole for accommodating the opposite end, and the first coupling electrode is disposed at a side wall of the slot or hole, or the first coupling electrode is a conductive part of the side wall of the slot or hole.

The communication device of an embodiment of the present application could not only improve communication quality and connection reliability on the basis of reducing communication power consumption of a portable device (such as an earphone or a charging case), but also reduce a volume of the portable device, simplify a structure and further improve user experience.

According to a third aspect, provided is a portable device including the communication device according to the second aspect.

According to a fourth aspect, provided is a communication system including the communication device according to the second aspect and an opposite end of the communication device.

DESCRIPTION OF EMBODIMENTS

Embodiments of the present application may be applied to various portable devices.

The portable device includes, but is not limited to, a charging case and a wearable device, where the wearable device includes, but is not limited to, a wireless earphone, an electronic watch, a hearing aid, and the like. The wireless earphone includes, but is not limited to, an ear-hanging earphone, a semi-in-ear earphone, an in-ear earphones, a headset, and the like. The charging case includes, but is not limited to, a charging case of a wireless earphone or a charging case of other electronic products, and the like.

Hereinafter, a method for transmitting information, a communication device, a portable device and a communication system according to embodiments of the present application will be described in detail with reference to FIGS. 1 to 17.

It should be noted that, for convenience of description, in embodiments of the present application, the same reference numerals represent the same components, and detailed description of the same components is omitted in different embodiments for the sake of brevity. It should be understood that dimensions such as the thicknesses, lengths and widths of various components in embodiments of the present application shown in the drawings, as well as dimensions of the overall thickness, length and width of an earphone and a charging case are merely illustrative, and should not constitute any limitation to the present application.

Figure 1:
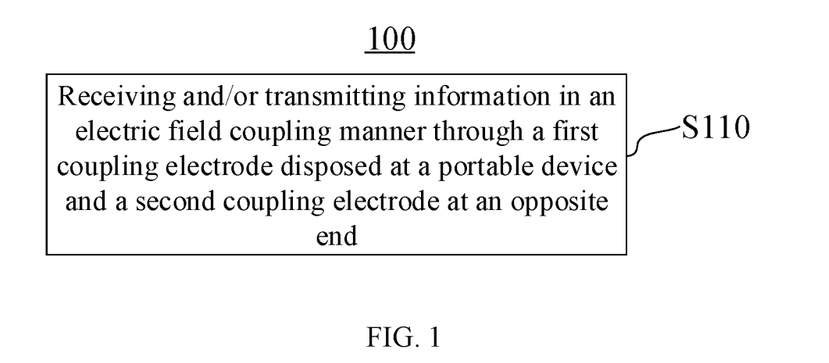
FIG. 1 is a schematic flowchart of a method for transmitting information according to an embodiment of the present application.

FIG. 1 is a schematic block diagram of a method 100 for transmitting information according to an embodiment of the present application. It should be understood that the method 100 may be executed by a portable device or an electronic device including the portable device. For ease of understanding, the method 100 will be described in detail below by taking the method being executed by a portable device as an example.

As shown in FIG. 1, the method 100 may include:

S110, a portable device may receive and/or transmit information in an electric field coupling manner through a first coupling electrode disposed at a portable device and a second coupling electrode at an opposite end.

Specifically, the portable device acquires a baseband signal, then generates a modulation signal based on the baseband signal, and receives and/or transmits the modulation signal in an electric field coupling manner through the first coupling electrode and the second coupling electrode.

Taking transmitting a modulation signal through the first coupling electrode and the second coupling electrode as an example, a transmitting circuit of the portable device may acquire a baseband signal, generate a modulation signal based on the baseband signal and inject the modulation signal into the first coupling electrode, and thereby the modulation signal may be transmitted to the second coupling electrode through the first coupling electrode.

Specifically, after the portable device inputs the modulation signal to the first coupling electrode, an electric field around the first coupling electrode changes. Due to a close distance between the first coupling electrode and the second coupling electrode, an electric field around the second coupling electrode also changes. Therefore, the opposite end may induce the change of the electric field around the second electrode through the second coupling electrode, and further receive the modulation signal transmitted by the portable device. In other words, the first coupling electrode and the second coupling electrode form a coupling capacitor; after the portable device inputs the modulation signal to the first coupling electrode, an electric field around the coupling capacitor changes, and the opposite end may induce the change of the electric field around the coupling capacitor through the second coupling electrode to generate an alternating current signal, where the alternating current signal may be configured to transmit a signal or energy. For example, the alternating current signal may be configured to transmit the modulation signal.

When the portable device receives information transmitted by the opposite end, the portable device acquires the modulation signal transmitted by the opposite end in an electric field coupling manner through the first coupling electrode and the second coupling electrode, and then demodulates the modulation signal to acquire the baseband signal that can be identified by the portable device. A specific principle thereof is similar to a principle that the portable device transmits information to the opposite end, which will not be described repeatedly herein to avoid repetition.

In the embodiment of the present application, the portable device may perform communication based on the electric field coupling manner. The first coupling electrode and the second coupling electrode are used to form a coupling capacitor. The coupling capacitor refers to a capacitor that may be used for coupling. The coupling may refer to a process of propagating a signal from the first coupling electrode to the second coupling electrode, or a process of propagating a signal from the second coupling electrode to the first coupling electrode. The electric field coupling may refer to a coupling manner generated due to the presence of the coupling capacitor.

In addition, the coupling capacitor may be used to ensure communication quality in addition to the coupling. For example, a signal transmits from the first coupling electrode to the second coupling electrode, the first coupling electrode may transmit a received signal to the second coupling electrode as lossless as possible and remove an unnecessary signal. Specifically, since a capacitor has a characteristic of blocking a direct current and passing an alternating current, the coupling capacitor can not only transmit an alternating current component (that is, information to be transmitted) from the first coupling electrode to the second coupling electrode, but also block a direct current component doped in the alternating current component.

In addition, performing the communication through the electric field coupling manner could avoid setting a physical contact point for the portable device and could increase connection reliability of the portable device such as connection reliability between earphones or an earphone and a charging case.

Optionally, a modulation degree and/or a signal strength of the modulation signal injected in the first coupling electrode by the portable device may be correlated with the first coupling electrode and the second coupling electrode. For example, the modulation degree and/or the signal strength of the modulation signal are correlated with an electrode area of the first coupling electrode and an electrode area of the second coupling electrode; for example, the larger the electrode area of the first coupling electrode and the electrode area of the second coupling electrode are, the smaller the modulation degree and/or the signal strength of the modulation signal are. For another example, the modulation degree and/or the signal strength of the modulation signal are correlated with an electrode shape of the first coupling electrode and an electrode shape of the second coupling electrode. For another example, the modulation degree and/or the signal strength of the modulation signal are correlated with a dielectric material between the first coupling electrode and the second coupling electrode such as a material of a housing of a device where the first coupling electrode is located and a material of a housing of the opposite end.

The first coupling electrode and the second coupling electrode may be a thin sheet or a thin plate made of a conductor or an entity having a conductive characteristic. The first coupling electrode and the second coupling electrode may have a regular shape such as a rectangle, an ellipse, a circle, and the like. The electrode areas of the first coupling electrode and the second coupling electrode may be greater than or equal to a certain threshold.

Optionally, a difference between a projection area of the first coupling electrode on a first plane and a projection area of the second coupling electrode on the first plane is less than or equal to a preset threshold, and the first plane is parallel to a plane where the first coupling electrode is located or a plane where the second coupling electrode is located. For example, when the first coupling electrode or the second coupling electrode is a thin rectangular sheet, the first plane is an upper surface or a lower surface of the thin rectangular sheet. In the embodiment of the present application, it may be set such that the difference between the projection area of the first coupling electrode on the first plane and the projection area of the second coupling electrode on the first plane is less than or equal to the preset threshold, a size of the first coupling electrode and the second coupling electrode may be controlled, thereby controlling a volume of the first earphone and the second earphone.

In addition, the difference between the projection area of the first coupling electrode on the first plane and the projection area of the second coupling electrode on the first plane may be greater than a certain threshold to ensure communication quality between the first coupling electrode and the second coupling electrode.

The first coupling electrode may be disposed directly opposite to the second coupling electrode to increase a sensing range of the first coupling electrode and the second coupling electrode to the greatest extent, thereby ensuring communication quality between the first coupling electrode and the second coupling electrode. For example, an inner surface of the first coupling electrode may be disposed directly opposite to an inner surface of the second coupling electrode. Further, the first coupling electrode and the second coupling electrode may be symmetrically disposed. For example, the first coupling electrode and the second coupling electrode may be axial symmetrically disposed, where an axis of symmetry of the first coupling electrode and the second coupling electrode may be an axis of symmetry of the portable device to which the first coupling electrode belongs and the opposite device to which the second coupling electrode belongs.

It should be understood that in the embodiment of the present application, a main body for executing the method 100 may be a portable device. In other words, the method 100 may be applied to a portable device. For example, the portable device may be a wireless earphone or a charging case. For another example, the portable device may also be other portable electronic devices such as an electronic watch.

For example, the method 100 is applied to a first earphone in a pair of earphones, the first earphone may transmit information to an opposite end in an electric field coupling manner through a first coupling electrode and a second coupling electrode. For example, the first earphone transmit at least one of the following information of the first earphone to the opposite end in an electric field coupling manner through the first coupling electrode and the second coupling electrode:

status information, battery information, pairing information, and voice information.

The status information of the first earphone may be used to indicate whether the first earphone is in a connected state with an electronic device (such as a mobile phone). The battery information may include parameter information of a battery of the first earphone and battery capacity information of the battery of the first earphone. The pairing information may be used to establish a connection with an electronic device or an earphone. The voice information may be voice information acquired by a microphone of the first earphone.

When the method 100 is applied to the first earphone, an opposite end may be a second earphone of the pair of earphones. For example, the first earphone is an earphone worn by a left ear and the second earphone is an earphone worn by a right ear. The opposite end may also be a charging case of the first earphone.

For example, the portable device is a pair of earphones, one end for communication is a first earphone of the pair of earphones and the opposite end is a second earphone of the pair of earphones, when the first earphone fails to receive the information transmitted by the second earphone, it indicates that the pair of earphones are not worn by one person, and the first earphone may be controlled to independently upload voice information. In this case, the second earphone may also independently upload voice information. For example, when a user is making a phone call using the first earphone and the first earphone cannot receive the information transmitted by the second earphone, the first earphone may be controlled to independently upload voice information.

In other words, whether the first earphone can receive the information transmitted by the second earphone can determine whether the first earphone and the second earphone are worn by one person; and when the first earphone and the second earphone are not worn by one person, both the first earphone and the second earphone may independently upload voice information. For example, when two people use the first earphone and the second earphone respectively, because a left earphone and a right earphone of a pair of earphones may independently upload voice information, the two people may use a pair of earphones to perform multi-party communication with a third party such as a three-way conference call.

Specifically, since a main constituent of a human body is water, the human body is a medium with a high dielectric constant (about 80), when two ears of a same person wear the first earphone and the second earphone respectively, and when the first coupling electrode of the first earphone and the second coupling electrode of the second earphone are both in contact with skin of the human body, it is equivalent to inserting a medium with a very high dielectric constant between the first coupling electrode and the second coupling electrode, that is, a distance between the first earphone and the second earphone is equivalent to a shortening of about 80 times.

In other words, when the first coupling electrode and the second coupling electrode are both in contact with skin of the human body, it is equivalent to that the first coupling electrode is strongly coupled to the second coupling electrode, which could effectively reduce a communication driving frequency. For example, when the first coupling electrode and the second coupling electrode are not in contact with the skin of the human body, their operating frequencies need to be between 1-10 MHz, and when the first coupling electrode and the second coupling electrode are in contact with the skin of the human body, their operating frequencies may be frequencies of KHz level.

Based on this principle, in the embodiment of the present application, when the first earphone and the second earphone perform communication in an electric field coupling manner, not only are requirements for the first coupling electrode and the second coupling electrode low, but also whether the first earphone and the second earphone are worn by one person can be detected. Specifically, when information interaction between the first earphone and the second earphone fails, it is determined that the first earphone and the second earphone are not worn by one person, and at this time, the first earphone and the second earphone may be controlled to independently upload voice information respectively, thereby implementing multi-party communication. Furthermore, the first earphone and the second earphone independently upload voice information, which may effectively protect the privacy of a user.

It should be understood that the pair of earphones in the embodiment of the present application may include an earphone worn by a left ear and an earphone worn by a right ear, that is, a left earphone and a right earphone. The left earphone and the right earphone may form a pair of earphones in a paring manner. For example, when the pair of earphones may be a headset, the first earphone and the second earphone may be respectively portions where two earmuffs of the headset are located. For another example, when the pair of earphones are ear-hanging earphones, the first earphone and the second earphone are respectively portions of the ear-hanging earphones hanging on two ears. For another example, when the pair of earphones are semi-in-ear earphones or in-ear earphones, the first earphone and the second earphone are respectively portions inserted into two ears.

It should also be understood that the two earphones of the pair of earphones in the embodiment of the present application may be a physically separated left earphone and right earphone, or may be a physically connected left earphone and right earphone, which are not specifically limited in the embodiment of the present application.

For example, the method 100 is applied to a charging case such as a charging case of a third earphone. The charging case may transmit information to an opposite end in an electric field coupling manner through a first coupling electrode and a second coupling electrode. For example, the charging case may transmit at least one of the following information of the charging case to the opposite end in an electric field coupling manner through the first coupling electrode and the second coupling electrode:

status information, battery information, and voice information.

where the voice information is information acquired by the charging case from a terminal device connected to the charging case. The status information of the charging case may be used to indicate whether the charging case is in a chargeable state, for example, whether the charging case has a remaining slot or hole for accommodating the third earphone. The battery information may include parameter information of a battery of the charging case and battery capacity information of the battery of the charging case.

When the method 100 is applied to the charging case, the opposite end may be the third earphone or other electronic devices capable of charging using the charging case.

The method for transmitting information by the portable device according to the embodiment of the present application is described above with reference to FIG. 1, and a communication device and an electronic device including the communication device according to an embodiment of the present application will be described below with reference to FIGS. 2 to 6.

Figure 2:
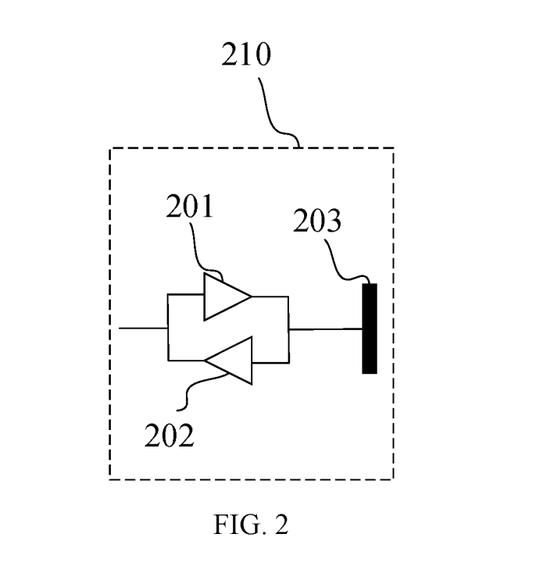
FIG. 2 is a schematic diagram of a communication device according to an embodiment of the present application.

FIG. 2 is a schematic block diagram of a communication device 210 according to an embodiment of the present application.

As shown in FIG. 2, a communication device 210 may include a first transmitting circuit 201, a first receiving circuit 202, and a first coupling electrode 203, where the first transmitting circuit 201 and the first receiving circuit 202 are connected to the first coupling electrode, respectively. The first transmitting circuit 201 is configured to transmit information to an opposite end in an electric field coupling manner through the first coupling electrode 203 and a second coupling electrode at the opposite end, and the first receiving circuit 202 is configured to receive information transmitted by the opposite end in an electric field coupling manner through the first coupling electrode 203 and the second coupling electrode.

Specifically, the first transmitting circuit 201 may be configured to acquire a baseband signal, then generate a modulation signal based on the baseband signal, and finally transmit the modulation signal to the opposite end in an electric field coupling manner through the first coupling electrode 203 and the second coupling electrode.

Optionally, a modulation degree and/or a signal strength of the modulation signal are correlated with the first coupling electrode 203 and the second coupling electrode.

Optionally, a difference between a projection area of the first coupling electrode 203 on a first plane and a projection area of the second coupling electrode on the first plane is less than or equal to a preset threshold, and the first plane is parallel to a plane where the first coupling electrode 203 is located or a plane where the second coupling electrode is located.

Optionally, the first coupling electrode 203 is disposed directly opposite to the second coupling electrode.

Optionally, the communication device 210 may be applied to a first earphone in a pair of wireless earphones, and the information transmitted by the first transmitting circuit 201 includes at least one of the following information of the first earphone: status information, battery information, pairing information, and voice information.

Optionally, the communication device 210 also includes a processing unit.

When the first receiving circuit 202 fails to receive the information transmitted by the opposite end, the processing unit is configured to control the first earphone to independently upload voice information.

Optionally, the communication device 210 may also be applied to a charging case, and the information transmitted by the first transmitting circuit 201 includes at least one of the following information of the charging case: status information, battery information, and voice information. The voice information is information acquired by the charging case from a terminal device connected to the charging case.

It should be understood that the communication device 210 may be configured to execute the method 100 described in FIG. 1, and its specific communication process and principle may refer to the related description in FIG. 1; and in order to avoid repetition, the related description of the communication process and principle of the communication device 210 is omitted in this section. Similarly, the first coupling electrode 203 and the second coupling electrode may also refer to the foregoing related description, which will not be described repeatedly herein to avoid repetition.

It should also be understood that FIG. 2 is merely an example of an embodiment of the present application and may not be understood as a limitation on the present application.

For example, in other alternative embodiments, the communication device 210 may also include a fixing member configured to support the first transmitting circuit 201, the first receiving circuit 202, and the first coupling electrode 203.

Hereinafter, a specific implementation manner of applying the communication device 210 to the first earphone and the charging case will be described in detail.

When the communication device 210 is applied to the first earphone, the first coupling electrode 203 may be disposed at any position of the first earphone, or a certain component of the first earphone may be used as the first coupling electrode 203.

Figure 3:
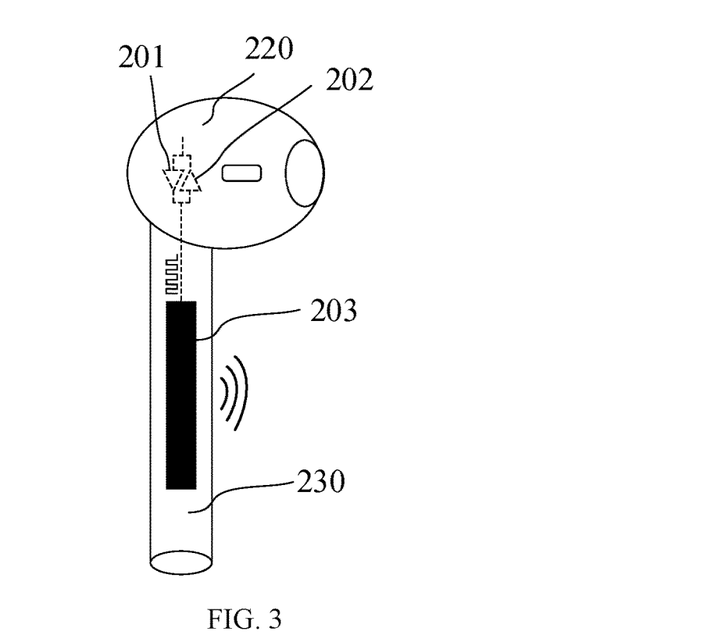
FIGS. 3 and 4 are schematic structural diagrams of an earphone including the communication device described in FIG. 2.
Figure 4:
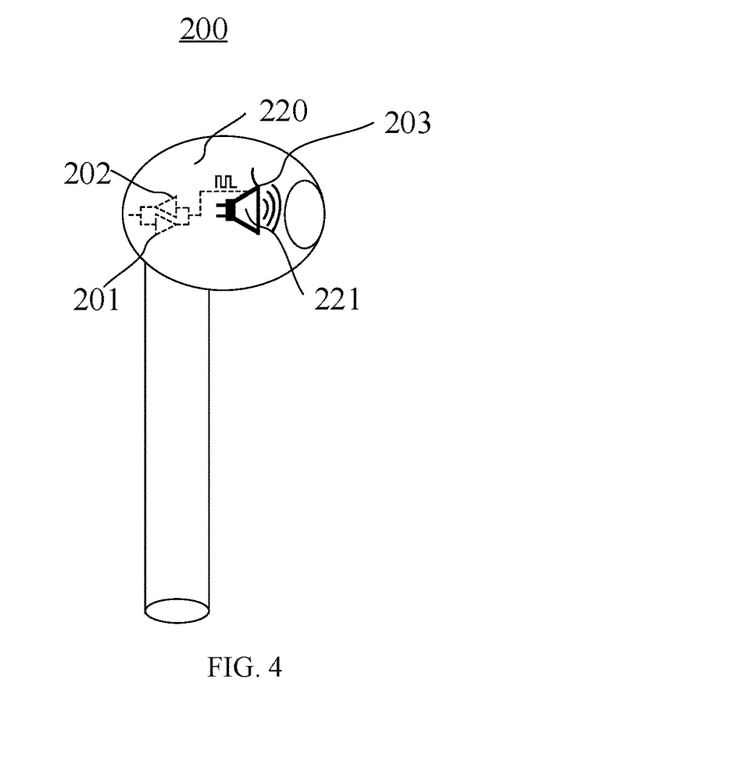

FIGS. 3 and 4 are schematic structural diagrams of a first earphone 200 including the communication device 210 shown in FIG. 2 according to an embodiment of the present application. As shown in FIGS. 3 and 4, the first earphone 200 may include the communication device 210, an earbud 220 of the earphone, and a rod part 230 of the earphone. The communication device may include a first transmitting circuit 201, a first receiving circuit 202, and a first coupling electrode 203.

As shown in FIG. 3, the first coupling electrode 203 may be disposed at the rod part 230 of the first earphone 200. For example, the first coupling electrode 203 may be disposed at a first side wall of the rod part 230 of the first earphone 200 close to the earbud 220 of the first earphone, or the first coupling electrode 203 may be disposed at a side wall opposite to the first side wall. For example, the first coupling electrode 203 is disposed at the first side wall, the first coupling electrode 203 may be disposed inside the first side wall of the rod part 230, may also be disposed outside the first side wall, or even the first coupling electrode 203 may be a portion of the first side wall. For example, part of a conductive side wall of the first side wall may be used as the first coupling electrode 203 of the communication device 210 to reduce space overhead and further reduce a volume of the first earphone 200.

As shown in FIG. 4, the first coupling electrode may be disposed in the earbud 220 of the first earphone 200. The first coupling electrode 203 may be a conductive housing of a speaker 221 of the first earphone 200. In other words, the conductive housing of the speaker 221 in the earbud 220 of the first earphone 200 may be used as the first coupling electrode 203. Since a magnet of the speaker 221 will not affect an electric field used for communication, this implementation manner not only could ensure communication quality of the first earphone 200, but also does not need to additionally manufacture an transmitting electrode of the first earphone 200, thereby effectively reducing the space overhead and further reducing the volume of the first earphone 200.

It should be understood that FIGS. 3 and 4 are merely an example of the embodiment of the present application and may not be understood as a limitation on the present application.

For example, in other alternative embodiments, the communication device 210 may be disposed inside the first earphone 200 through other implementation manners. For example, the first coupling electrode 203 may be separately provided inside the earbud 230 of the first earphone 200. For another example, the first coupling electrode 203 may be disposed at any component of the earbud of the first earphone, such as a rear housing or a front housing thereof. For another example, a portion of any component of the earbud of the first earphone such as the rear housing or the front housing thereof may be used as the first coupling electrode 203.

When the communication device 210 is applied to a charging case, the first coupling electrode 203 may be disposed at any position of the charging case, or a certain component of the charging case may be used as the first coupling electrode 203.

Figure 5:
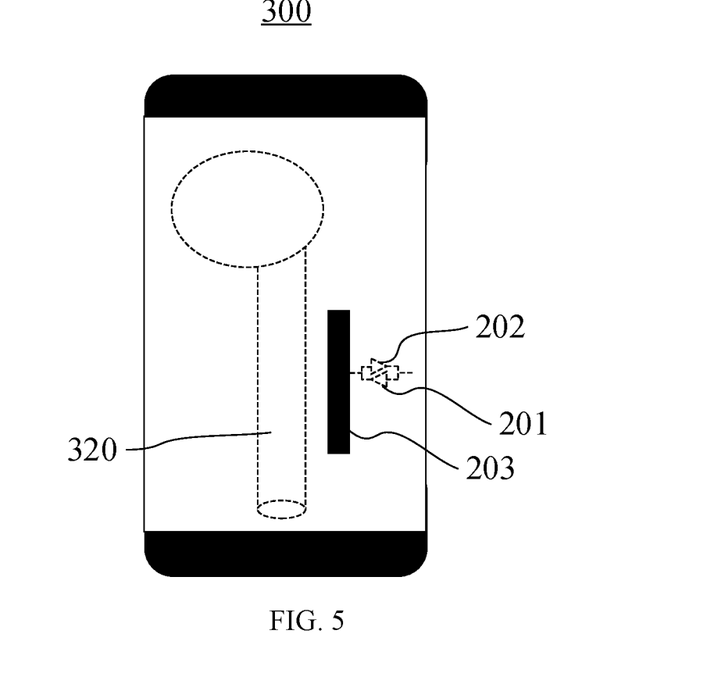
FIGS. 5 and 6 are schematic structural diagrams of a charging case including the communication device described in FIG. 2.
Figure 6:
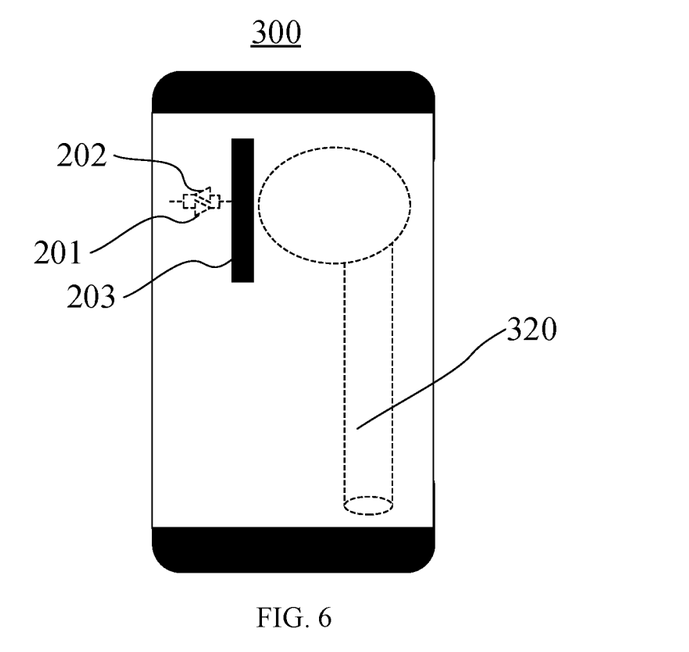

FIGS. 5 and 6 are schematic structural diagrams of a charging case 300 including the communication device 210 shown in FIG. 2 according to an embodiment of the present application. The charging case 300 may be a charging case of a third earphone. As shown in FIGS. 5 and 6, the charging case 300 is provided with a slot or hole 320 for accommodating the third earphone, and a shape of the slot or hole 320 may be a shape of the third earphone. The first coupling electrode 203 is disposed at a side wall of the slot or hole 320. As shown in FIG. 5, the first coupling electrode 203 may be disposed at a side wall of the slot or hole 320 close to a rod part of the third earphone. As shown in FIG. 6, the first coupling electrode 203 may also be disposed at a side wall of the slot or hole 320 close to an earbud of the third earphone.

It should be understood that FIGS. 5 and 6 are merely an example of the embodiment of the present application and may not be understood as a limitation on the present application.

For example, in other alternative embodiments, the shape of the slot or hole 320 of the charging case 300 may be other general shapes, and for another example, when a portion of the side wall of the slot or hole 320 of the charging case 300 is a conductive material, the portion of the side wall of the slot or hole 320 may be used as the first coupling electrode 203.

The first earphone 200 and the charging case 300 including the communication device 210 according to the embodiments of the present application are described above with reference to FIGS. 2 to 6. A communication system of an embodiment of the present application will be described in detail below with reference to FIGS. 7 to 17. The communication system may be a system to which the method 100 or the device 200 is applicable. The communication system may include a plurality of electronic devices such as portable devices. The electronic device in the communication system may be configured with the communication device 200 as shown in FIG. 2, so that the plurality of electronic devices may perform communication using the method 100 as shown in FIG. 1. In other words, the communication system may include a plurality of electronic devices using the method 100 as shown in FIG. 1 or a plurality of electronic devices configured with the communication device 210 as shown in FIG. 2.

Figure 7:
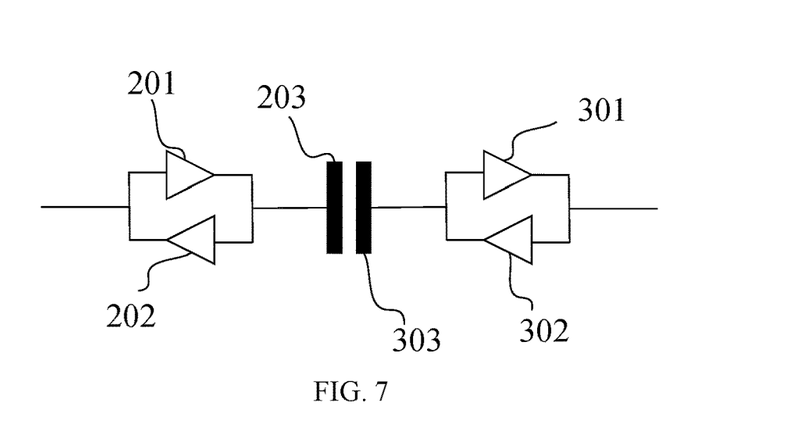
FIG. 7 is a schematic diagram of a communication system according to an embodiment of the present application.

FIG. 7 is a schematic diagram of a communication system 400 according to an embodiment of the present application.

As shown in FIG. 7, the communication system 400 may include a first transmitting circuit 201, a first coupling electrode 203, and a second receiving circuit 302. The first coupling electrode 203 is connected to the first transmitting circuit 201. The second receiving circuit 302 is connected to a second coupling electrode 303. The first transmitting circuit 201 is configured to transmit information to the second receiving circuit 302 in an electric field coupling manner through the first coupling electrode 203 and the second coupling electrode 303.

Optionally, as shown in FIG. 7, the communication system 400 may further include a first receiving circuit 202 and a second transmitting circuit 301. The first receiving circuit 202 is connected to the first coupling electrode 203. The second transmitting circuit 301 is connected to the second coupling electrode 303. The first receiving circuit 202 is configured to receive information transmitted by the second transmitting circuit 301 in an electric field coupling manner through the first coupling electrode 203 and the second coupling electrode 303.

Specifically, the first transmitting circuit 201 may be configured to acquire a baseband signal, then generate a modulation signal based on the baseband signal, and then transmit the modulation signal to the second receiving circuit 302 in an electric field coupling manner through the first coupling electrode 203 and the second coupling electrode 303.

Optionally, a modulation degree and/or a signal strength of the modulation signal are correlated with the first coupling electrode 203 and the second coupling electrode 303.

Optionally, a difference between a projection area of the first coupling electrode 203 on a first plane and a projection area of the second coupling electrode 303 on the first plane is less than or equal to a preset threshold, and the first plane is parallel to a plane where the first coupling electrode 203 is located or a plane where the second coupling electrode 303 is located.

Optionally, the first coupling electrode 203 is disposed directly opposite to the second coupling electrode 303.

Optionally, the first coupling electrode 203 is disposed in a first earphone of a pair of wireless earphones, the second coupling electrode 303 is disposed in a second earphone of the pair of earphones, and the information transmitted by the first transmitting circuit 201 includes at least one of the following information of the first earphone: status information, battery information, pairing information, and voice information.

Optionally, the communication system 400 also includes a processing unit.

When the second receiving circuit 302 fails to receive the information transmitted by the first transmitting circuit 201, the processing unit is configured to control the first earphone and the second earphone to independently upload voice information. Alternatively, after the first transmitting circuit 201 transmits information to the second receiving circuit, when the first receiving circuit 202 cannot receive a response message transmitted by the second transmitting circuit 301, the processing unit is configured to control the first earphone and the second earphone to independently upload voice information.

The processing unit may be disposed in the first earphone, or in the second earphone, or in the first earphone and the second earphone simultaneously.

Optionally, the first coupling electrode 203 is disposed in a third earphone, the second coupling electrode 303 is disposed in a charging case of the third earphone, and the information transmitted by the first transmitting circuit 201 includes at least one of the following information of the third earphone: status information, battery information, pairing information, and voice information.

Optionally, the first coupling electrode 203 is disposed in a charging case of a fourth earphone, the second coupling electrode 303 is disposed in the fourth earphone, and the information transmitted by the first transmitting circuit 201 includes at least one of the following information of the charging case: status information, battery information, and voice information; where the voice information is information acquired by the charging case from a terminal device connected to the charging case.

It should be understood that an electronic device in the communication system 400 may be configured to execute the method 100 described in FIG. 1, and its specific communication process and principle may refer to the related description in FIG. 1; and in order to avoid repetition, the related description of the communication process and principle is omitted in this section. Similarly, the first coupling electrode 203 and the second coupling electrode may also refer to the foregoing related description, which will not be described repeatedly herein to avoid repetition.

Hereinafter, a specific implementation manner of the communication system 400 will be described in detail.

FIGS. 8 to 11 are a communication system formed by a pair of earphones to which an embodiment of the present application is applicable.

Figure 8:
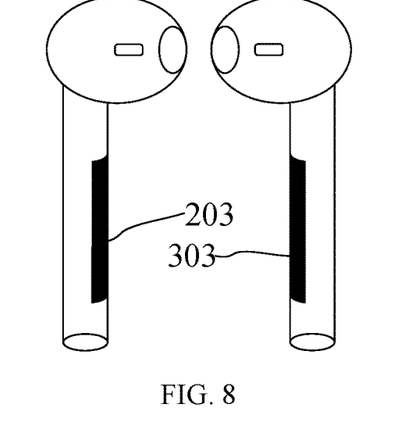
FIGS. 8 to 11 are schematic diagrams of a communication system formed by two earphones according to an embodiment of the present application.

As shown in FIG. 8, a first coupling electrode 203 may be disposed at a side wall of a rod part of a left earphone close to an earbud, and a second coupling electrode 303 may be disposed at a side wall of a rod part of a right earphone close to an earbud. The first coupling electrode 203 and the second coupling electrode 303 are symmetrically disposed. The left earphone and the right earphone may perform communication in an electric field coupling manner through the first coupling electrode 203 and the second coupling electrode 303. This design manner could not only effectively reduce a production difficulty of earphones, but also facilitate electric field coupling communication.

Figure 9:
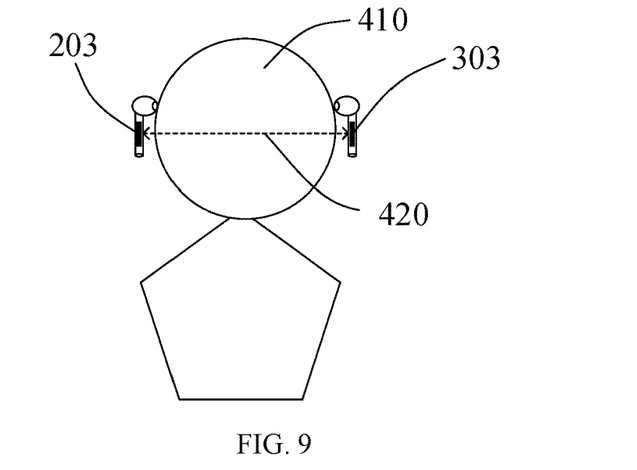

As shown in FIG. 9, in a process of using the left earphone and the right earphone, the first coupling electrode 203 and the second coupling electrode 303 are symmetrically disposed with respect to a head 410 of a human body, and an electric field coupling path 420 is formed between the first coupling electrode 203 and the second coupling electrode 303 and communication is performed through the electric field coupling path 420.

Figure 10:
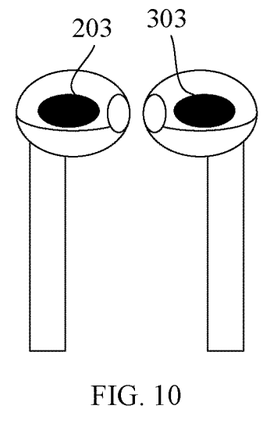

As shown in FIG. 10, a first coupling electrode 203 may be disposed inside an earbud of a left earphone, and a second coupling electrode 303 may be disposed inside an earbud of a right earphone. The first coupling electrode 203 and the second coupling electrode 303 are symmetrically disposed. The left earphone and the right earphone may perform communication in an electric field coupling manner through the first coupling electrode 203 and the second coupling electrode 303. This design manner could not only effectively reduce a production difficulty of earphones, but also facilitate the saving of space overhead, and the reduction of a volume of the earphone.

Figure 11:
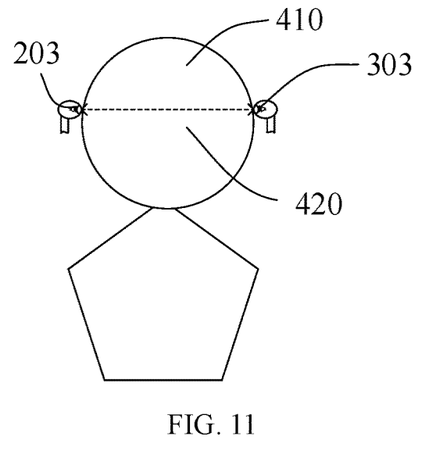

As shown in FIG. 11, in a process of using the left earphone and the right earphone, the first coupling electrode 203 and the second coupling electrode 303 are symmetrically disposed with respect to a head 410 of a human body, and an electric field coupling path 420 is formed between the first coupling electrode 203 and the second coupling electrode 303 and communication is performed through the electric field coupling path 420.

FIGS. 12 to 17 are a communication system formed by an earphone and a charging case of the earphone to which an embodiment of the present application is applicable.

Figure 12:
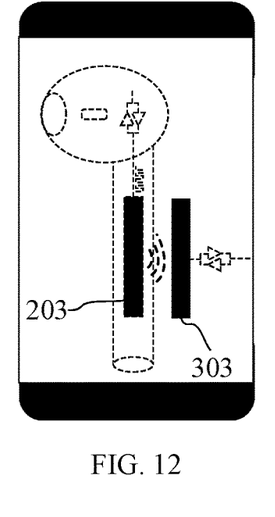
FIGS. 12 to 18 are schematic diagrams of a communication system formed by an earphone and a charging case according to an embodiment of the present application.

As shown in FIG. 12, a first coupling electrode 203 may be disposed at a side wall of a rod part of a right earphone, and a second coupling electrode 303 may be disposed at a side wall of a structure for accommodating the right earphone of a charging case, the side wall being close to the rod part of the right earphone. The first coupling electrode 203 is disposed directly opposite to the second coupling electrode 303. The charging case and the right earphone may perform communication in an electric field coupling manner through the first coupling electrode 203 and the second coupling electrode 303. This design manner could not only effectively reduce a production difficulty of an earphone and a charging case, but also facilitate electric field coupling communication.

Figure 13:
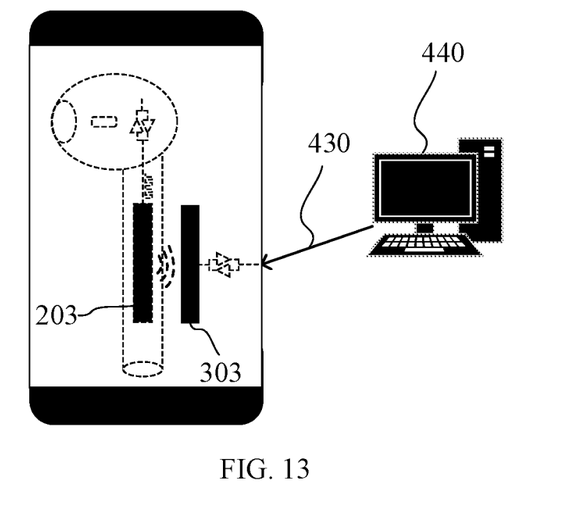

As shown in FIG. 13, the charging case may also be connected to a computer device 440 via a cable 430 (such as a USB cable), and the charging case may acquire voice information from the computer device 440 and transmit it to the right earphone in an electric field coupling manner through the first coupling electrode 203 and the second coupling electrode 303.

Figure 14:
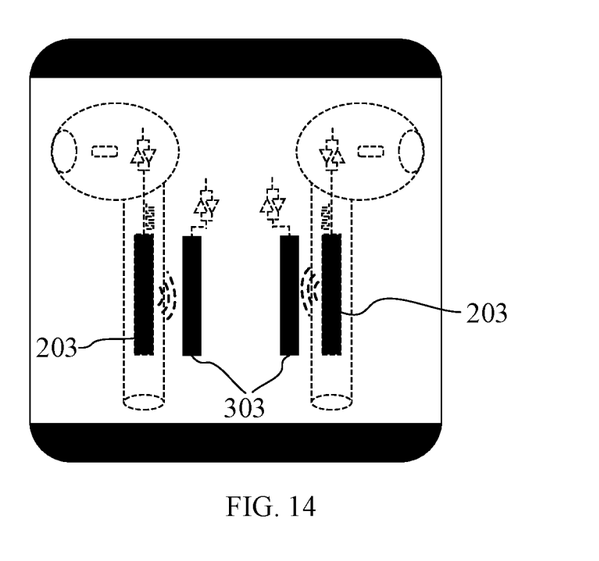

As shown in FIG. 14, a first coupling electrode 203 may be respectively disposed at a side wall of a rod part of a left earphone and a side wall of a rod part of a right earphone, and a charging case for charging the left earphone and the right earphone may be respectively provided with a second coupling electrode 303 for the left earphone and the right earphone.

Figure 15:
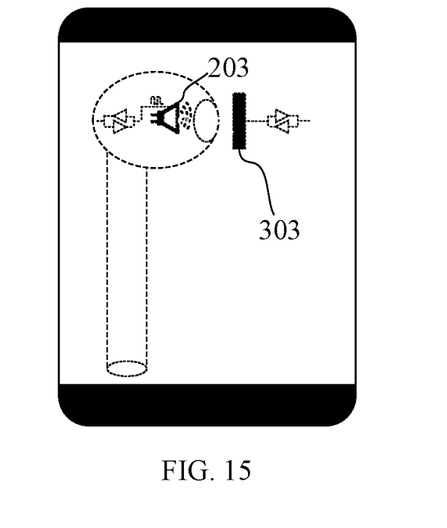

As shown in FIG. 15, a first coupling electrode 203 may be disposed inside an earbud of a left earphone, and a second coupling electrode 303 may be disposed at a side wall of a structure for accommodating the left earphone of a charging case, the side wall being close to the earbud of the left earphone. The first coupling electrode 203 is disposed directly opposite to the earbud of the left earphone. The charging case and the left earphone may perform communication in an electric field coupling manner through the first coupling electrode 203 and the second coupling electrode 303. This design manner could not only effectively reduce a production difficulty of an earphone, but also facilitate the saving of space overhead, and the reduction of a volume of the earphone.

Figure 16:
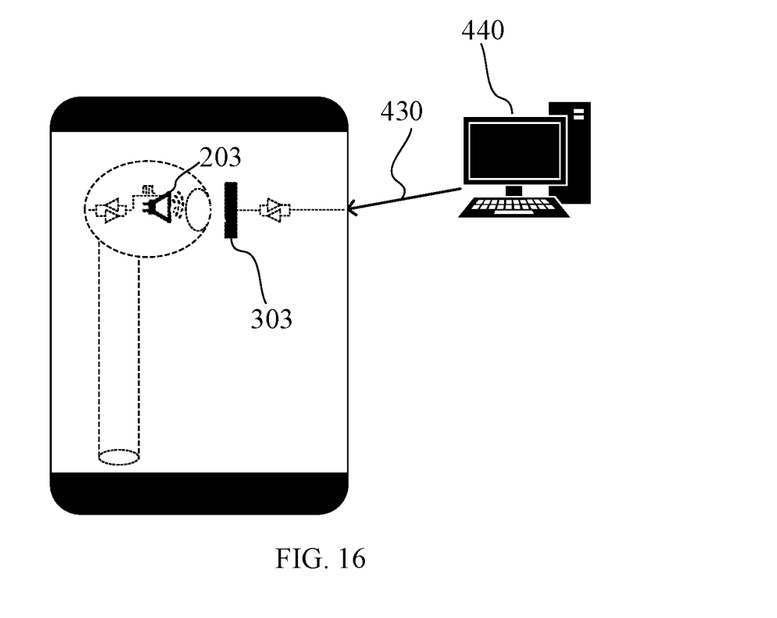

As shown in FIG. 16, a charging case may also be connected to a computer device 440 via a cable 430 (such as a USB cable), and the charging case may acquire voice information from the computer device 440 and transmit it to the left earphone in an electric field coupling manner through the first coupling electrode 203 and the second coupling electrode 303.

Figure 17:
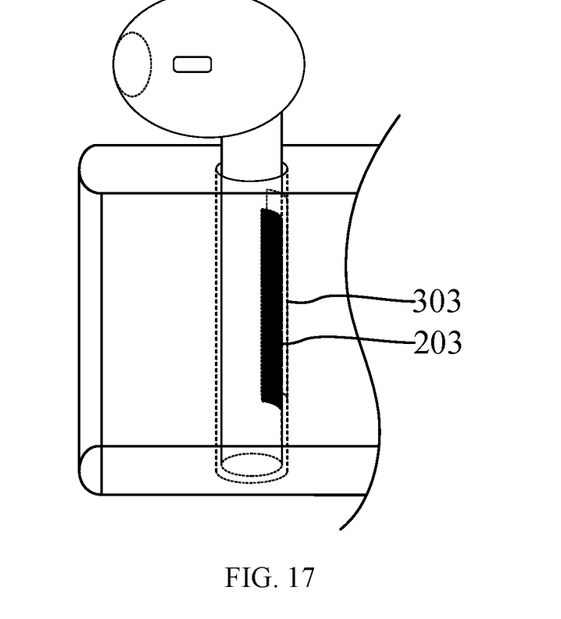

As shown in FIG. 17, a first coupling electrode 203 may be disposed at a rod part of a right earphone, and a second coupling electrode 303 may be disposed at a side wall of a structure for accommodating the right earphone of a charging case, the side wall being away from an earbud of the right earphone. This implementation manner is particularly suitable for a charging case that perform charging through a rod part accommodating the right earphone.

Figure 18:
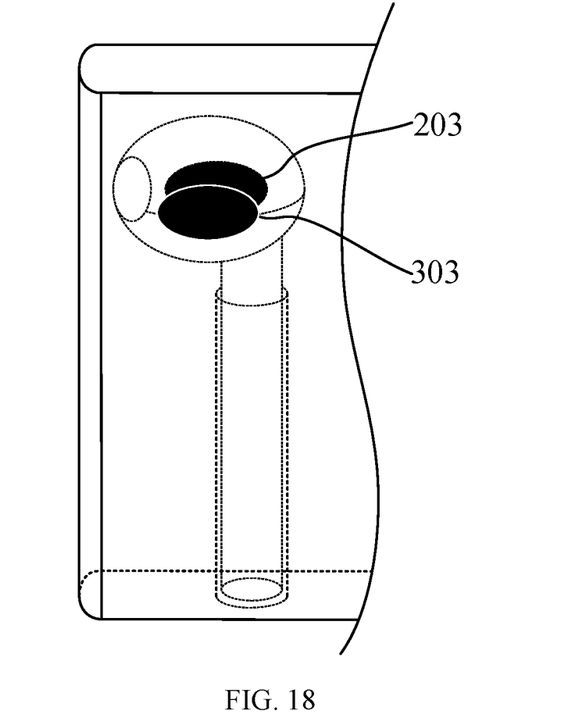

As shown in FIG. 18, when a housing of a speaker of a right earphone is used as a first coupling electrode 203, a second coupling electrode 303 may be disposed at any plane of a structure for accommodating the right earphone of a charging case, the any plane being close to an earbud of the right earphone, and the first coupling electrode 203 is disposed directly opposite to the second coupling electrode 303.

It should be understood that FIGS. 8 to 18 are merely exemplary descriptions of the communication system 400 and may not be understood as a limitation on the present application.

For example, the communication system 400 may also be used for communication between an electronic watch and a charging case.

For another example, the communication system 400 may be used for communication between a charging case and a charging case.

Persons of ordinary skill in the art may be aware that various exemplary units and circuits described in conjunction with the embodiments disclosed herein can be implemented by electronic hardware or a combination of computer software and electronic hardware. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the present application.

It should be understood that, in the several embodiments provided in the present application, the disclosed circuits, branches, and units may be implemented in other manners.

For example, division of processing units is merely logical function division and may be implemented in various ways; for example, the processing unit may be a processing unit of an earphone or a charging case, or for another example, the processing unit may be a processing unit of a terminal device capable of performing wired or wireless communication with the earphone or the charging case.

For another example, if being implemented in the form of a software functional unit and sold or used as a separate product, the processing unit may be stored in a computer readable storage medium. Based on such understanding, the nature of the technical solutions of the present application, or the part contributing to the prior art, or part of the technical solutions may be implemented in a form of software product. The software product is stored in a storage medium and includes several instructions for instructing an earphone or a charging case to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for transmitting information, the method being applied to a portable device and comprising:
    receiving and/or transmitting information in an electric field coupling manner through a first coupling electrode disposed at the portable device and a second coupling electrode at an opposite end;
    wherein the method is applied to a first earphone in a pair of wireless earphones, the first coupling electrode is disposed at a rod part of the first earphone, or the first coupling electrode is a conductive component of the first earphone;
    the method further comprising:
    determining whether the pair of wireless earphones are worn by a same user; and
    controlling the first earphone to independently upload voice information when the pair of wireless earphones are not worn by the same user.

2. The method according to claim 1, wherein the first coupling electrode is a conductive housing of a speaker of the first earphone.

3. The method according to claim 1, wherein the first coupling electrode is disposed at a first side wall of the rod part close to an earbud of the first earphone, or the first coupling electrode is disposed at a side wall opposite to the first side wall.

4. The method according to claim 1, wherein the receiving and/or transmitting the information in the electric field coupling manner through the first coupling electrode disposed at the portable device and the second coupling electrode at the opposite end comprises:
    transmitting at least one of the following information of the first earphone to the opposite end in an electric field coupling manner through the first coupling electrode and the second coupling electrode: status information, battery information, pairing information, and voice information.

5. The method according to claim 1, wherein the determining whether the pair of wireless earphones are worn by the same user comprises:
    determining that the pair of wireless earphones are not worn by the same user when receiving information transmitted by the opposite end fails.

6. The method according to claim 1, wherein a difference between a projection area of the first coupling electrode on a first plane and a projection area of the second coupling electrode on the first plane is less than or equal to a preset threshold, and the first plane is parallel to a plane where the first coupling electrode is located or a plane where the second coupling electrode is located.

7. The method according to claim 1, wherein the receiving and/or transmitting the information in the electric field coupling manner through the first coupling electrode disposed at the portable device and the second coupling electrode at the opposite end comprises:
    acquiring a baseband signal;
    generating a modulation signal based on the baseband signal; and
    receiving and/or transmitting the modulation signal in an electric field coupling manner through the first coupling electrode and the second coupling electrode;
    wherein a modulation degree and/or a signal strength of the modulation signal are correlated with the first coupling electrode and the second coupling electrode.

8. A communication device applied to a portable device, comprising:
    a first coupling electrode;
    a first transmitting circuit and a first receiving circuit, which are connected to the first coupling electrode, respectively;
    wherein the first transmitting circuit is configured to transmit information to an opposite end in an electric field coupling manner through the first coupling electrode and a second coupling electrode at the opposite end, and the first receiving circuit is configured to receive information transmitted by the opposite end in an electric field coupling manner through the first coupling electrode and the second coupling electrode;
    wherein the portable device is a first earphone in a pair of wireless earphones, the first coupling electrode is disposed at a rod part of the first earphone, or the first coupling electrode is a conductive component of the first earphone;
    wherein the communication device further comprises:
    a processing unit configured to:
    determine whether the pair of the wireless earphones are worn by a same user; and
    control the first earphone to independently upload voice information when the pair of the wireless earphones are not worn by the same user.

9. The communication device according to claim 8, wherein the first coupling electrode is a conductive housing of a speaker of the first earphone.

10. The communication device according to claim 8, wherein the first coupling electrode is disposed at a first side wall of the rod part close to an earbud of the first earphone, or the first coupling electrode is disposed at a side wall opposite to the first side wall.

11. The communication device according to claim 8, wherein the information transmitted by the first transmitting circuit comprises at least one of the following information of the first earphone: status information, battery information, pairing information, and voice information.

12. The communication device according to claim 8, wherein the processing unit is configured to:
    determine that the pair of wireless earphones are not worn by a same user when receiving information transmitted by the opposite end fails.

13. The communication device according to claim 8, wherein a difference between a projection area of the first coupling electrode on a first plane and a projection area of the second coupling electrode on the first plane is less than or equal to a preset threshold, and the first plane is parallel to a plane where the first coupling electrode is located or a plane where the second coupling electrode is located.

14. The communication device according to claim 13, wherein the first coupling electrode is disposed directly opposite to the second coupling electrode.

15. The communication device according to claim 8, wherein the first transmitting circuit is configured to:
   acquire a baseband signal;
   generate a modulation signal based on the baseband signal; and
   transmit the modulation signal to the opposite end in an electric field coupling manner through the first coupling electrode and the second coupling electrode;
   wherein a modulation degree and/or a signal strength of the modulation signal are correlated with the first coupling electrode and the second coupling electrode.

16. A communication system applied to a portable device, wherein the communication system comprises the communication device according to claim 8 and an opposite end of the communication device.

17. The communication system according to claim 16, wherein the communication device is applied to a first earphone of a pair of wireless earphones, the opposite end is a second earphone of the pair of wireless earphones; or the communication device is applied to a third earphone, the opposite end is a charging case of the third earphone; or the communication device is applied to a charging case of a fourth earphone, the opposite end is the fourth earphone.

18. A portable device, comprising a communication device;
wherein, the communication device comprises:
a first coupling electrode;
a first transmitting circuit and a first receiving circuit, which are connected to the first coupling electrode, respectively;
wherein the first transmitting circuit is configured to transmit information to an opposite end in an electric field coupling manner through the first coupling electrode and a second coupling electrode at the opposite end, and the first receiving circuit is configured to receive information transmitted by the opposite end in an electric field coupling manner through the first coupling electrode and the second coupling electrode;
wherein the portable device is a first earphone in a pair of wireless earphones, the first coupling electrode is disposed at a rod part of the first earphone, or the first coupling electrode is a conductive component of the first earphone;
wherein the communication device further comprises:
a processing unit configured to:
determine whether the pair of the wireless earphones are worn by a same user; and
control the first earphone to independently upload voice information when the pair of the wireless earphones are not worn by the same user.

* * * * *